United States Patent

Mori et al.

[11] Patent Number: 5,697,709
[45] Date of Patent: Dec. 16, 1997

[54] DYNAMIC PRESSURE TYPE BEARING DEVICE

[75] Inventors: Natsuhiko Mori, Mie-ken; Takashi Minami; Yasuhiro Yamamoto, both of Kuwana; Kiyotaka Kusunoki, Shizuoka-ken; Masakazu Hirata, Mie-ken, all of Japan

[73] Assignee: NTN Corporation, Osaka, Japan

[21] Appl. No.: 683,155

[22] Filed: Jul. 18, 1996

[30] Foreign Application Priority Data

Jul. 18, 1995 [JP] Japan ................. 7-181808
Sep. 26, 1995 [JP] Japan ................. 7-247323

[51] Int. Cl.$^6$ ................................ F16C 33/20
[52] U.S. Cl. .................. 384/297; 384/909; 384/911
[58] Field of Search .................. 384/276, 297, 384/299, 300, 908, 909, 907, 911

[56] References Cited

U.S. PATENT DOCUMENTS

| | | |
|---|---|---|
| 4,193,645 | 3/1980 | Baker et al. ............. 384/909 X |
| 4,319,790 | 3/1982 | Thomson ................... 384/297 |
| 4,875,263 | 10/1989 | Furumura ................. 384/297 X |
| 5,118,210 | 6/1992 | Ikejiri et al. ............ 384/911 X |
| 5,129,739 | 7/1992 | Asai et al. ............... 384/300 X |

*Primary Examiner*—Thomas R. Hannon
*Attorney, Agent, or Firm*—Nikaido, Marmelstein, Murray & Oram LLP

[57] ABSTRACT

A dynamic pressure type bearing comprises a sleeve rotatably holding a shaft driven by a motor composed of a rotor and a stator, one or both of the sleeve and the shaft being made of a resin material. The sleeve and/or shaft of a resin material may have a thin film of oil or grease formed on the surface thereof. Preferably, the resin material has load flexible temperture of 120° C. or more, modules of elasticity or bending of 10 GPa or more, and coefficient of linear expansion of $3\times10^{-5}$/°C. or less.

13 Claims, 6 Drawing Sheets

FIG.2

| | | EMBODIMENT | | | | | |
|---|---|---|---|---|---|---|---|
| | | 1 | 2 | 3 | 4 | 5 | 6 | 7 |
| MATERIAL COMPOSITION (wt.%) | | | | | | | |
| | PPS | 50 | 40 | 20 | 50 | 30 | 30 | 30 |
| | MICA I | 20 | 40 | 60 | 40 | 40 | 42 | 42 |
| | CARBON FIBER I | 30 | 20 | 20 | 10 | 30 | 20 | 20 |
| | LUBRICATING OIL | 0 | | | | | 6 | 6 |
| | TARC | 0 | | | | | 3 | 3 |
| ROUNDNESS OF SLEEVE INNER CIRCUMFERENCE (μm) | | 3 | | | | | | 10 |
| LOAD FLEXIBLE TEMPERATURE (°C) | | 260 OR MORE | | | | | | |
| MODULES OF BENDING ELASTICITY (GPa) | | 34 | 34 | 37 | 26 | 42 | 18 | 18 |
| COEFFICIENT OF LINEAR EXPANSION ($\times 10^{-5}$/°C) | | 1.6 | 1.4 | 0.9 | 1.7 | 1.1 | 1.0 | 1.0 |
| EVALUATION RESULTS | | | | | | | | |
| START/STOP LIFE ($\times 10^3$ TIMES) | | 33 | 35 | 50 | 36 | 42 | 100 | 100 |
| RUN-OUT (μm) | | 10 OR LESS | | | | | 8 OR LESS | 5 OR LESS |
| UNSTABLE VIBRATION IN DRIVE | | NONE | | | | | | |

FIG.3

| | COMPARATIVE EXAMPLE | | | | |
|---|---|---|---|---|---|
| | 1 | 2 | 3 | 4 | 5 |
| MATERIAL COMPOSITION (wt.%) | | | | | |
| PPS | 70 | 40 | 40 | 40 | 0 |
| PP | 0 | 0 | 0 | 0 | 40 |
| MICA 1 | 10 | 0 | 40 | 60 | 40 |
| MICA 2 | 0 | 40 | 0 | 0 | 0 |
| CARBON FIBER 1 | 20 | 20 | 0 | 0 | 0 |
| CARBON FIBER 2 | 0 | 0 | 20 | 0 | 0 |
| LOAD FLEXIBLE TEMPERATURE (°C) | 260 | --- | 265 | --- | 110 |
| MODULES OF BENDING ELASTICITY (GPa) | 21 | --- | 9 | --- | 10 |
| COEFFICIENT OF LINEAR EXPANSION ($\times 10^{-5}$/°C) | 2.1 | | 1.4 | 2.0 | 7.4 |
| EVALUATION RESULTS | 1) | 2) | 3) | 4) | 1), 5) |

1) DEFECTIVE SHAPE
2) DEFECTIVE DISPERSION
3) INSUFFICIENT RIGIDITY
4) INSUFFICIENT STRENGTH
5) INSUFFICIENT HEAT RESISTANCE

FIG.6

| | | EMBODIMENT | | COMPARATIVE EXAMPLE | |
|---|---|---|---|---|---|
| | | 8 | 9 | 6 | 7 |
| MATERIAL COMPOSITION (wt.%) | | | | | |
| | PPS | 40 | 40 | 40 | 50 |
| | MICA | 40 | 40 | 40 | 20 |
| | CARBON FIBER | 20 | 20 | 20 | 30 |
| THIN FILM TREATMENT | | MONTAN WAX 5 wt.% + HEXANE 95 wt.% | | NONE | |
| SLEEVE'S INNER CIRCUMFERENCE SHAPE | | CIRCULAR | ARCUATE (POLYHEDRAL) | CIRCULAR | CIRCULAR |
| LOAD FLEXIBLE TEMPERATURE (°C) | | 260 OR MORE | | | |
| MODULES OF BENDING ELASTICITY (GPa) | | 34 | | | |
| COEFFICIENT OF LINEAR EXPANSION ($\times 10^{-5}$/°C) | | 1.4 | | | 1.6 |
| EVALUATION RESULTS | | | | | |
| START/STOP LIFE (CYCLE) | | 100,000 OR MORE | | 35,000 | 33,000 |
| RUN-OUT (μm) | | 10 OR LESS | 5 OR LESS | 10 OR LESS | |
| UNSTABLE VIBRATION IN DRIVE | | NONE | | | |

DYNAMIC PRESSURE TYPE BEARING DEVICE

BACKGROUND OF THE INVENTION a. Field of the Invention

The present invention relates to a dynamic pressure type bearing device, and more particularly to one suited to a polygon scanner motor as in laser mirror printer and facsimile apparatus.

b. Prior Art

A dynamic pressure type bearing device is characterized by contact-free relative rotation between a shaft and a sleeve with the ratio of a diametrical clearance therebetween to the shaft diameter ranging from 2/10000 to 500/10000. In view of the fact that when starting and stopping, the shaft and sleeve come in sliding contact with each other, some of the conventional gas dynamic pressure type bearing apparatus employ a special surface treatment to enhance the wear resistance on the outer circumference of the shaft and the inner circumference of the sleeve made of metal material (for example, Japanese Laid-open Patent 7-27131), while others have grooves formed in either the outer circumference of the shaft or inner surface of the sleeve for generating dynamic pressure (herringbone grooves, etc,). In some instances, the shaft and sleeve are made from ceramic materials in order to enhance further the wear resistance.

Oil lubrication say be also considered as the means for improving the wear resistance, but oil lubrication is not preferred especially when the dynamic pressure type bearing apparatus is used for high performance polygon scanner motor as in laser mirror printer and facsimile apparatus; for one thing, load of the drive motor and frictional heat raise the oil temperature causing high speed rotation over 10000 rpm difficult, and for another leakage of lubricating oil can lead to contamination of polygon mirror and rotation failure.

As for the support for axial load, meanwhile, various constitutions are employed, for example, a contact-free support with a plane dynamic pressure type bearing provided at a shaft end, a contact support in the central part of a convex shaft end, and a contact-free support utilizing magnetic force exerted by a permanent magnet provided at a shaft end or sleeve outer circumference.

While the dynamic pressure type bearing device has functional merits as compared with roller bearings, such as excellent precision of rotation, low noise and compact design, it requires surface treatment, machining of dynamic pressure grooves, and the like, and hence it is inferior to roller bearings in the aspects of cost, starting and stopping life, and other functions, which is the reason why it is not widely employed at the present.

It was attempted to lower the cost by using synthetic resins (Japanese Laid-open Patents 59-220321, 63-19117, 5-312213, etc.), but the consideration for wear resistance or precision is insufficient in these proposals. Use of synthetic resin in consideration of wear resistance is described in Japanese Laid-open Patent 4-78313; Nevertheless the resin composition proposed therein is low in elasticity, and the characteristics such as modulus of elasticity and coefficient of linear expansion are anisotropic, failing to achieve high dimensional and shape precision necessary for maintaining the function of dynamic pressure type bearing.

It is hence a primary object of the invention to provide a dynamic pressure type bearing device excellent in economy, and suited to a polygon scanner motor for use in laser mirror printer, facsimile apparatus, etc.

SUMMARY OF THE INVENTION

In one embodiment of the invention, at least one of the shaft and the sleeve rotatably receiving the shaft with a diametrical clearance therebetween is formed of a resin composition with load flexible temperature of 120° C. or more, modulus of elasticity of bending of 10 CPa or more, and coefficient of linear expansion of $3 \times 10^{-5}$/°C. or less.

The diametrical clearance between the shaft and sleeve is selected to be in the range of 2/10000 to 500/10000 in relation to the mean diameter of the shaft.

The resin composition may comprise, for example, 20 to 50 wt. % of synthetic resin, 20 to 60 wt. % of inorganic filler, and 10 to 30 wt. % of fibrous reinforcing material. Moreover, 1 to 7 wt. % of lubricating oil and 1 to 5 wt. % of oil retaining agent may be added.

The inorganic filler to be blended may be 0.5 to 80 µm in average particle size, 150 GPa or more in modulus of longitudinal elasticity, and $1 \times 10^{-5}$/°C. or less in coefficient of linear expansion. The fibrous reinforcing material to be blended may be 200 GPa or more in modulus of tensile elasticity.

If required, in addition, grooves for generating dynamic pressure may be formed in either the outer circumference of the shaft or inner circumference of the sleeve.

The outer circumference of the shaft and inner circumference of the sleeve may be both round, or alternatively, either one may be round and the other not round.

In the case where the outer circumference of the shaft and/or inner circumference of the sleeve is round, the roundness is ideally 0, although tolerances must be defined practically. Herein, the term roundness refers to the degree of error from a geometrical circle of a circular object in question (JIS B 0621), and as shown in FIG. 5A, for example, the roundness is 0.003 if the circumference exists in between the two concentric circles with the difference between the radii of 0.003 mm in a cross section perpendicular to the axis.

The outer circumference of the shaft or the inner circumference of the sleeve may be of a non-circular cross-section, e.g., it may be formed in a corrugated cross-section having convex and concave portions alternating in the circumferential direction. FIG. 5B schematically shows three undulations, the difference between radius a of a circle inscribing the corrugated shape add radius b of a circumscribing circle ranging from 2/1000 to 50/1000 min.

The synthetic resin to be contained in the resin composition may preferably be a thermoplastic, resin suited to injection molding, and more preferably a crystalline resin excellent in stability and wear resistance. Examples of synthetic resin having such properties include polyphenylene sulfide resin, polyacetal resin, polybutylene terephthalate resin, polyethylene terephthalate resin, and polyamide resin. However, the polyamide resin should be used in the case of operation in dry atmosphere since subject to change in dimension and lowering in strength when absorbing water.

The blending inorganic filler may preferably be powder having low coefficient of linear expansion, high modulus of elasticity, and low coefficient of friction. Examples of inorganic filler having such properties include mica and graphite. To assure a favorable state of dispersion, the mean particle size may preferably range from 0.5 to 80 µm. The blending rate of the inorganic filler ranges from 20 to 60 wt. %, preferably 40 to 60 wt. %, of 20 to 50 wt. % of synthetic resin. On the one hand, if the blending rate of the inorganic filler is less than 20 wt. %, the molding shrinkage rate, coefficient of linear expansion and anisotropy of such properties of the resin composition cannot be decreased to a desired level, and on the other if the blending rate of the inorganic, filler is over 60 wt. %, the bending strength of the resin composition is inferior, and the dimensional precision and shape precision of the resin composition (molding) are not achieved to a desired level.

The blending fibrous reinforcing; material is not particularly limited as far as the synthetic resin can be reinforced, and, for example, carbon fiber, glass fiber, aromatic polyamide fiber, alumina fiber, asbestos, wollastonite, and potassium titanate may be used. A fibrous reinforcing material with the modulus of tensile elasticity of 200 GPa or more may advantageously be used to obtain a resin composition (molding) of better precision. Carbon fiber and aromatic polyamide fiber excellent in wear resistance may also be preferable. One kind or a combination of two or more kinds of fibrous reinforcing; material may be used. The mean fiber diameter of the fibrous reinforcing material may advantageously range from about 0.5 to 30 µm to assure a favorable disperse state. The blending rate of the fibrous reinforcing material may preferably ranges from 10 to 30 wt. % of 20 to 50 wt. % of synthetic resin. The blending rate of the fibrous reinforcing material less than 10 wt. % causes the reinforcing effect to the insufficient while the blending rate of the fibrous reinforcing material over 30 wt. % renders the precision of the resin composition (molding) unstable.

In the resin composition as described, the wear resistance is also considered in addition to the modulus of elasticity and coefficient of linear expansion, and in particular it fulfills all characteristics and functions usually required as a component of the dynamic pressure type bearing device for polygon scanner motor.

However, the wear resistance may be insufficient even with such resin composition in the case where a heavy load exceeding 1 kgf/cm2 is to be carried upon starting and/or stopping, or in the case in which a long starting and stopping life of over 100,000 times is required. The resin composition for use in such cases may advantageously contain 1 to 7 wt. % of lubricating oil and 1 to 5 wt. % of oil retaining agent in addition to the above-described resin composition.

The blending lubricating oil may be petroleum lubricating oil or synthetic lubricating oil, and not particularly limited as far as it is excellent in heat resistance. For example, silicone oil and fatty acid ester oil may be used. The lubricating oil may be retained within the synthetic resin by an oil retaining agent for exudation at an appropriate rate. Examples of the oil retaining agent include talc, clay, carbon, active carbon, and calcium carbonate. The blending rate of the lubricating agent may preferably ranges from 1 to 7 wt. % in the resin composition. The blending rate of the lubricating oil is less than 1 wt. % cannot impart adequate lunbricity to the resin composition, while the blending rate of the lubricating oil over 7 wt. % cause the lubricating oil to exude excessively to contaminate the surroundings of the bearing or lower the precision of the resin composition (molding).

The resin composition described herein may be molded by employing various known means. That is, the synthetic resin, various fillers and reinforcing materials may be mixed by Henschel mixer, tumbler mixer or other mixer, and supplied into an injection molding machine of excellent fusing and mixing performance, or alternatively, they may be preliminarily fused and mixed by heat roller, kneader, Bumbury mixer, or fusion extruder. The subsequent molding of the mixture may be carried out by proper means selected depending on the properties of the resin composition, such as compression molding method, extrusion molding method, and injection molding method.

The intention is not limited to the bearing device of the gas dynamic pressure type having gas existing in the gap between the shaft and sleeve, but the gap may be filled with lubricating oil, grease or the like as far as there is no problem of temperature rise due to load of the driving motor and frictional heat, or in the case of high-speed small-size motor not using polygon mirror or other devices that should avoid contamination by lubricating oil.

The constitution for supporting the axial load is not limited particularly, and includes, for example, a contact-free support with a planc dynamic pressure type bearing provided at a shaft end, a contact support in the central part of a convex shaft end, and a contact-free support utilizing magnetic force exerted by a permanent magnet provided at a shaft end or sleeve outer circumference.

Incidentally, the resin composition is so excellent in mouldability that several parts can be moulded into one body, thus, for instance, an axial load supporting member may be formed integrally with the sleeve.

According to other embodiment of the invention, at least one of the shaft and the sleeve rotatively receiving the shaft with a diametrical clearance therebetween is composed of a resin composition and has a thin film of oil or grease formed on a surface thereof.

The thin film may be formed of oil or grease with oily content of 98 wt. % or less.

The diametrical clearance between the shaft and sleeve may be selected range from 2/10000 to 500/10000 in relation to the mean diameter of the shaft.

The resin composition may be, for example, a resin composition with load flexible temperature of 120° C. or more, modulus of elasticity of bending of 10 GPa or more, and coefficient of linear expansion of $3\times10^{-5}$/°C. or less.

The resin composition may comprise 20 to 50 wt. % of synthetic resin, 20 to 60 wt. % of inorganic filler, and 10 to 30 wt. % of fibrous reinforcing material.

The inorganic filler to be blended may be 0.5 to 80 µm in average particle size, 150 GPa or more in modulus of longitudinal elasticity, and $1\times10^{-5}$/°C. or less in coefficient of linear expansion. The fibrous reinforcing material to be blended may be 200 GPa or more in modulus of tensile elasticity.

If required, in addition, grooves for generating dynamic pressure may be formed in either the outer circumference of the shaft or inner circumference of the sleeve, and in this case the range of the groove depth of the dynamic pressure generating grooves may be from 2/10000 to 100/10000 in relation to the mean diameter of the shaft.

The outer circumference of the shaft or inner circumference of the sleeve may be of multiple-arc-shaped cross-section composed of a plurality of arcuate surfaces, or of a corrugated shape undulating in the circumferential direction in a cross section perpendicular to the axis. FIG. 7 shows an example of a three-arc shape in which the three arcuate surfaces compose the inner circumference or the sleeve 4. The difference between an inscribed circle diameter (D1) and a circumscribed circle diameter (D2) of such multiple-arc shape (or corrugated shape) may ranges from 2/10000 to 100/10000 in relation to the mean diameter (D0) of the shaft.

The synthetic resin to be contained in the resin composition may preferably be a thermoplastic resin suited to injection molding, and more preferably a crystalline resin excellent in stability and wear resistance. Examples of synthetic resin having such properties include polyphenylene sulfide resin, polyacetal resin, polybutylene terephthalate resin, polyethylene terephthalate resin, and polyamide resin. However, the polyamide resin should be used in the case of operation in dry atmosphere since it is subject to change in dimension and lowering in strength when absorbing water.

The oil or grease used in forming the thin film is oil, grease, wax, fatty acid, etc. Examples of wax include natural wax such as vegetable wax (for example, carnauba wax), mineral wax (for example, montan wax), and petroleum wax (for example, microcrystalline wax), and synthetic wax such as polyethylene wax. The fatty acid includes palmitic acid, stearic acid, oleic acid, etc. The terminology oil or grease refers mainly to a mixture of triglyceryl ester of such fatty acids and fatty acid. Such oil or grease may be used either alone or in combination.

In the invention, the oil or grease preferably have the dropping point or melting point at 70° C. or higher. That is, the application of the invention is required to withstand environments of about 60° C., and if the melting point of oil or grease is less than 70° C., the fluidity is too high, and it is likely to be removed near the sliding surface and durability may not be maintained, or liquefaction is promoted by heat generation by sliding, and the friction torque may be increased. In such oil or grease, to further enhance the lubricity, oily matter (lubricating oil) may be also contained (about 98 wt. % or less) as far as the melting point is kept over 70° C.

The thin film of oil or grease may be formed in a very simple method, for example, as described below. That is, a predetermined amount of oil or grease (and oily matter) selected from the above examples of oil or grease is mixed into a proper organic solvent, and is heated over the fusing temperature or dissolving temperature of the oil or grease to disperse and dilute, and the resin composition formed in a specific shape is immersed in this treatment solution, and then lifted and cooled to evaporate the organic solvent, so that a thin film of oil or grease may be formed on the surface of the resin composition. Any special apparatus or treating method is not required for the formation of the thin film. Lubricating oil may replace the organic solvent. In this case, the oil deposit on the surface of the resin composition must be removed, which can be easily done by using a centrifugal separator or the like.

The blending inorganic filler may preferably be powder having low coefficient of linear expansion, high modulus of elasticity, and low coefficient of friction. Examples of inorganic filler having such properties include mica and graphite. To assure a favorable state of dispersion, the mean particle size may preferably range from 0.5 to 80 μm. The blending rate of the inorganic filler ranges from 20 to 60 wt. %, preferably 40 to 60 wt. %, of 20 to 50 wt. % of synthetic resin. On the one hand, if the blending rate of the inorganic filler is less than 20 wt. %, the molding shrinkage rate, coefficient of linear expansion and anisotropy of such properties of the resin composition cannot be decreased to a desired level, and on the other if the blending rate of the inorganic filler is over 60 wt. %, the bending strength of the resin composition is inferior, and the dimensional precision and shape precision of the resin composition (molding) are not achieved to a desired level.

The blending fibrous reinforcing material is not particularly limited as far as the synthetic resin can be reinforced, and, for example, carbon fiber, glass fiber, aromatic polyamide fiber, alumina fiber, asbestos, wollastonite, and potassium titanate may be used. A fibrous reinforcing material with the modulus of tensile elasticity of 200 GPa or more may advantageously be used to obtain a resin composition (molding) of better precision. Carbon fiber and aromatic polyamide fiber excellent in wear resistance may also be preferable. One kind or a combination of two or more kinds of fibrous reinforcing material may be used. The mean fiber diameter of the fibrous reinforcing material may advantageously range from about 0.5 to 30 μm to assure a favorable disperse state. The blending rate of the fibrous reinforcing material may preferably ranges from 10 to 30 wt. % of 20 to 50 wt. % of synthetic resin. If the blending rate of the fibrous reinforcing material less than 10 wt. % causes the reinforcing effect to be insufficient while the blending rate of the fibrous reinforcing material over 30 wt. % renders the precision of the resin composition (molding) unstable.

The resin composition described herein may be molded by employing various known means. That is, the synthetic resin, various fillers and reinforcing materials may be mixed by Henschel mixer, tumbler mixer or other mixer, and supplied into an injection molding machine of excellent fusing and mixing performance, or alternatively, they may be preliminarily fused and mixed by heat roller, kneader, Bumbury mixer, or fusion extruder. The subsequent molding of the mixture may be carried out by proper means selected depending on the properties of the resin composition, such as compression molding method, extrusion molding method, and injection molding method.

In the arrangement with a thin film of oil or grease on the surface of the resin composition, not only the modulus of elasticity and coefficient of linear expansion but the wear resistance and lubricity are taken into account, and in particular it fulfills all characteristics and functions usually required as a component of the dynamic pressure type bearing device for polygon scanner motor.

The axial load supporting structure is not limited particularly, and includes, for example, a contact-free support with a plane dynamic pressure type bearing provided at a shaft end, a contact support in the central part having a convex shaft end, and a contact-free support utilizing magnetic force exerted by a permanent magnet provided at a shaft end or sleeve outer circumference.

Incidentally, the resin composition is so excellent in mouldability that several parts can be moulded into one body; thus, for instance, an axial load supporting member may be formed integrally with the sleeve.

BRIEF DESCRIPTION OF THE DRAWINGS

FIG. 2 shows blending examples of various materials (embodiments 1 to 7) and results of function test.

FIG. 3 shows blending examples of various materials (comparative examples 1 to 6) and results of function test.

FIG. 6 shows blending examples of various materials (embodiments 8, 9 and comparative examples 6, 7) and results of function test.

DESCRIPTION OF THE PREFERRED EMBODIMENTS

Figure 1:
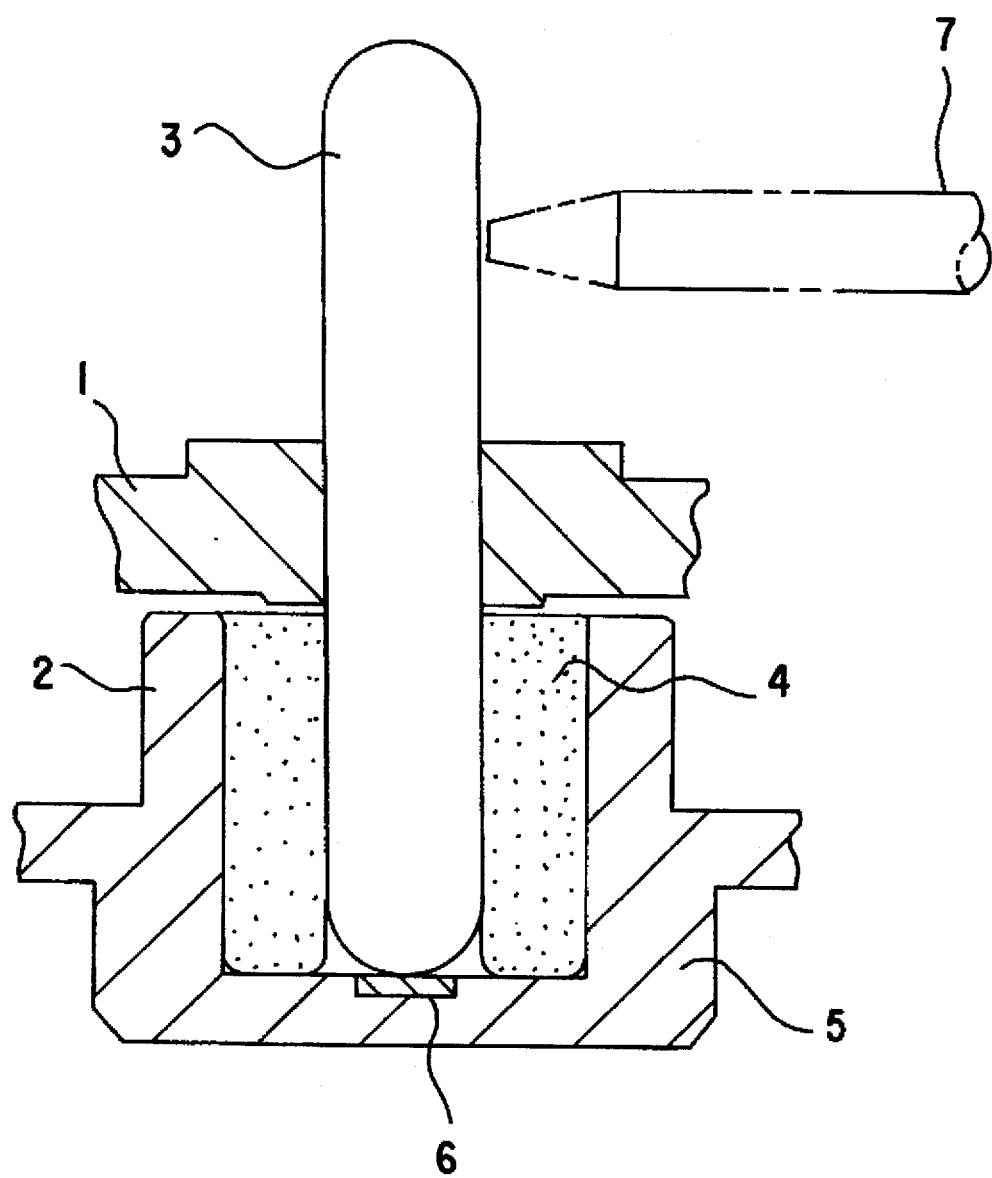
FIG. 1 is a sectional view showing a dynamic pressure type bearing device according to an embodiment of the invention.

In the dynamic pressure type bearing device shown in FIG. 1, a rotary shaft 3 (diameter about 4 mm) of a motor (11300 rpm) composed of a rotor 1 and a stator 2 is rotatably supported in a housing 5 by a sleeve 4 made of resin composition of embodiments 1 to 7 shown in FIG. 2. The convex lower end portion of the rotary shaft 3 is rotatably supported on a thrust bearing 6 disposed in the center of the bottom of the housing 5. The rotary shaft 3 is of, for example, stainless steel with no surface treatment nor heat treatment. Incidentally, grooves for generating dynamic pressure are not formed in either the outer circumference of the rotary shaft 3 or the inner circumference of the sleeve 4.

Figure 5A:
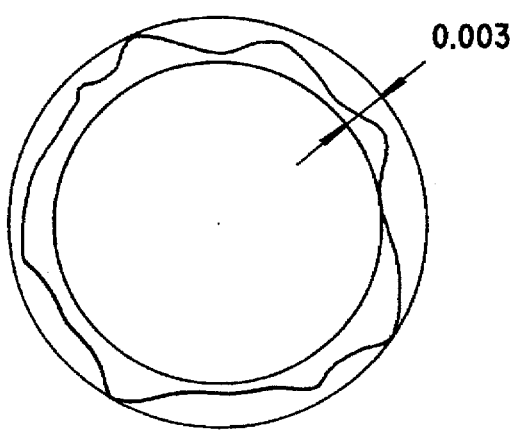
FIG. 5A is a schematic diagram explaining; roundness.
Figure 5B:
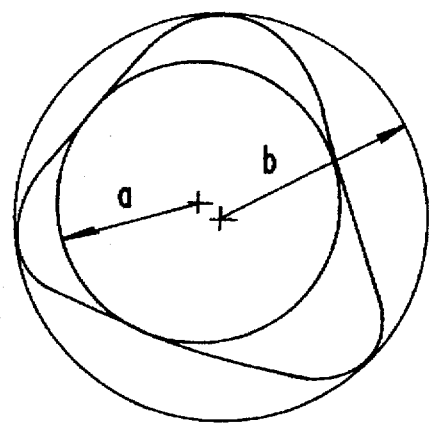
FIG. 5B is a schematic diagram explaining; corrugated shape.

The inner circumference of the sleeve 4 in embodiments 1 to 6 is of a circular cross-section with roundness of 3 μm or less (see FIG. 5A). The inner circumference of the sleeve 4 in embodiment 7 is corrugated in cross-section having three bottoms and three peaks alternating in the circumferential direction, with the difference between the diameters of inscribed circle and circumscribed circle being about 10 μm (see FIG. 5B). Therefore, the column of "Roundness of sleeve inner circumference" in FIG. 2 refers to the difference between the radii as far as embodiment 7 is concerned.

The outer circumference of the rotary shaft 3 in embodiments 1 to 7 is of a circular cross-section with roundness of 3 μm or less. The diametrical gap (bearing clearance) between the outer circumference of the rotary shaft 3 and the inner circumference of the sleeve 4 is about 10 μm. The term "rotary shaft 3" is not intended to exclude the reverse arrangement of a fixed shaft and a rotary sleeve from the invention.

[Embodiments 1, 2, 3, 4, 5, 6,]

In the blending rate shown in FIG. 2, polyphenylene sulfide (PPS) resin (TOHPLEN CO., LTD.: PPS-T4) was blended with mica 1 (CANADA MICA CO., LTD.: PHLO-GOPITE MICA, mean particle size 13 μm, modulus of longitudinal elasticity 175 GPa, coefficient of linear expansion 0.4 to $0.9 \times 10^{-5}/°C$.), carbon fiber 1 (TOHO RAYON CO., LTD.: BESPHITE HM, fiber diameter approx. 7 μm, fiber length 6 mm, modulus of tensile elasticity 343 GPa), fatty acid ester oil (NIPPON YUSHI CO., LTD.: NISSAN UNISTAR H) and talc, and after sufficiently mixing in a Henschel mixer, the mixture was supplied into a twin-axis fusion extruder, and extruded and pelletized, and pellets were supplied into an injection molding machine, and injected and molded in a specified die, and the sleeve 4 as shown in FIG. 1 was formed.

FIG. 2 summarizes results of evaluation of starting and stopping life, run-out precision, and presence or absence of unstable vibration during rotation and driving of the dynamic pressure type bearing device using the sleeve 4 in embodiment 1 through embodiment 7. Herein, the μstarting and stopping lifeμ refers to the number of times of operation until starting failure occurs, and the "run-out precision" and "presence or absence of unstable vibration during rotation and driving" were measured by using a contact-free displacement meter 7 indicated by chain line in FIG. 1.

As clear from the results in FIG. 2, the dynamic pressure type bearing device using the sleeve 4 in embodiment 1 through embodiment 7 satisfies the starting and stopping life and run-out precision required in the dynamic pressure type bearing device for polygon scanner motor as in laser beam printer and facsimile apparatus, in particular. As stated above, the material of the rotary shaft 3 is stainless steel, and neither surface treatment nor heat treatment is done, and grooves for generating dynamic pressure are not formed, and hence it is very advantageous from the viewpoint of manufacturing cost.

[Comparative examples 1, 2, 3, 4, 5]

In the blending rate shown in FIG. 3, PPS resin (TOHPLEN CO., LTD.: PPS-T4) or polypropylene (PP) resin (MITSUI PETROCHEMICAL INDUSTRIES, LTD.: POLYPRO J800) was blended with mica 1 (CANADA MICA CO., LTD.: PHLOGOPITE MICA, mean particle size 13 μm, modulus of longitudinal elasticity 175 GPa, coefficient of linear expansion 0.4 to $0.9 \times 10^{-5}/°C$.) or mica 2 (CANADA MICA CO., LTD.: PHLOGOPITE MICA, mean particle size 90 μm, modulus of longitudinal elasticity 175 GPa, coefficient of linear expansion 0.4 to $0.9 \times 10^{-5}/°C$.), and carbon fiber 1 (TOHO RAYON CO., LTD.: BESPHITE HM, fiber diameter approx. 7 μm, fiber length 6 mm, modulus of tensile elasticity 343 GPa) or carbon fiber 2 (KUREHA CHEMICAL INDUSTRY CO., LTD.: KRECA, fiber diameter approx. 15 μm, fiber length 6 mm, modulus of tensile elasticity 30 GPa), and after sufficiently mixing in a Henschel mixer, the mixture was supplied into a twin-axis fusion extruder, and extruded and pelletized, and pellets were supplied into an injection molding machine, and injected and molded in a specified die, and sleeves of same shape and dimensions as the sleeve 4 shown in FIG. 1 were formed. In comparative examples 1 to 4, meanwhile, the inner circumference of the sleeve 4 and the outer circumference of the rotary shaft are both circular in cross-section with roundness of 3 μm or less.

In the same constitution as in FIG. 1, the results of evaluation of starting and stopping life, run-out precision, and presence or absence of unstable vibration during rotation and driving of the dynamic pressure type bearing device using the sleeves in comparative examples 1 and 5 are shown in FIG. 3.

As clear from the result in FIG. 3, the dynamic pressure type bearing device using the sleeves in comparative examples 1 and 5 was inferior in the shape and dimensions of the bearing surface of the sleeve, and was disabled in rotation. In the sleeve of comparative example 2, the inorganic filler (mica 2) in the resin composition was not dispersed uniformly, and stable sleeve could not be formed. The dynamic pressure type bearing device using the sleeve of comparative example 3 was insufficient in rigidity of the formed sleeve, and the bearing surface of the sleeve was deformed when assembling into the housing, and it was impossible to rotate. The dynamic pressure type bearing device using the sleeve of comparative example 4 was insufficient in strength of the sleeve, and measured values of load flexible temperature and modulus of bending elasticity were unstable.

Thus, in the dynamic pressure type bearing device, especially one for a polygon scanner motor as in laser mirror printer and facsimile device, by composing at least one of the shaft and sleeve of the resin composition, surface treatment or material combination is not necessary for preventing wear due to sliding contact of the shaft and sleeve when starting and stopping. The resin composition of the invention is excellent in wear resistance, and hence combination with metal material not undergoing surface treatment or heat treatment is possible, as well as the combination of resin to resin.

In the conventional dynamic pressure bearing device, since the rigidity and maximum load capacity were smaller as compared with roller bearings, and balance correction of rotating elements was necessary for enhancing the run-out precision of the rotating element and preventing seizure of bearing due to run-out deflection, but by composing the rotating elements such as shaft and sleeve by using the resin composition, the mass decreases, and balance correction is not necessary depending on the conditions of use, and the time required for starting and stopping is shortened.

Figure 4:
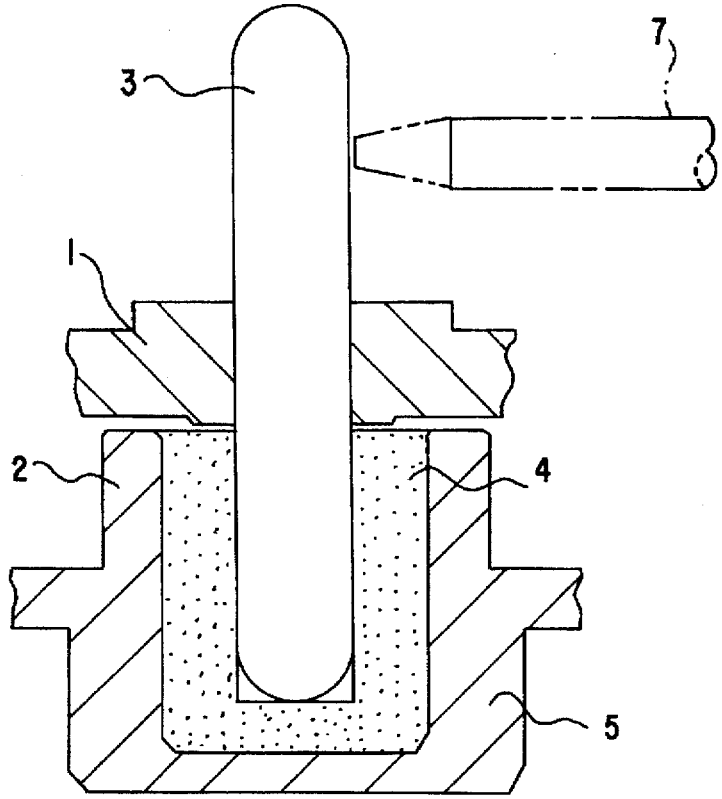
FIG. 4 is a sectional view showing a dynamic pressure type bearing device according to another embodiment of the invention.

Moreover, the resin composition is excellent in self-lubricity, and the parts can be integrated, and by integrating the parts, the number of parts is decreased and the total cost can be saved. For example, when the sleeve 4 is formed in a bottomed tubular form as shown in FIG. 4, so that the lower end of the rotary shaft 3 is supported on the bottom, the separate thrust bearing 6 as shown in FIG. 1 can be eliminated. Besides, although not shown, the bearing accommodating portion of the housing 5 and other parts can be formed into one body together with the sleeve 4.

As described herein, making at least one of the shaft and sleeve of the dynamic pressure type bearing device from the resin composition eliminates surface treatment or material combination for preventing wear due to sliding contact of the shaft and sleeve in starting and stopping.

Besides, a decrease of the mass by using the resin composition for composing the rotating element such as shaft and sleeve, renders balance correction dispensable, depending on the conditions of use, and reduces the time required for starting and stopping.

Furthermore, since the resin composition is also excellent in self-lubricity, it does not require, depending on the conditions of use, grooves for generating dynamic pressure in the outer circumference of the shaft or in the inner circumference of the sleeve, or non-round shape (multiple-arc shape, etc.) of the outer circumference of the shaft or inner circumference of the sleeve for the purpose of preventing unstable vibration.

Still more, the resin composition is excellent in molding performance allowing several parts to be integrated, and by integration of parts, the number of parts is decreased, and the total cost is reduced.

As a result of such effects, the invention provides a dynamic pressure type bearing device of long life, high reliability, and low price, especially one which is suited to a polygon scanner motor used in laser mirror printer and facsimile apparatus.

Embodiments similar to the dynamic pressure type bearing device previously described in connection with FIG. 1, except that the sleeve 4 is composed of the resin composition of embodiments 8 and 9 shown in FIG. 6 will now be described.

Figure 7:
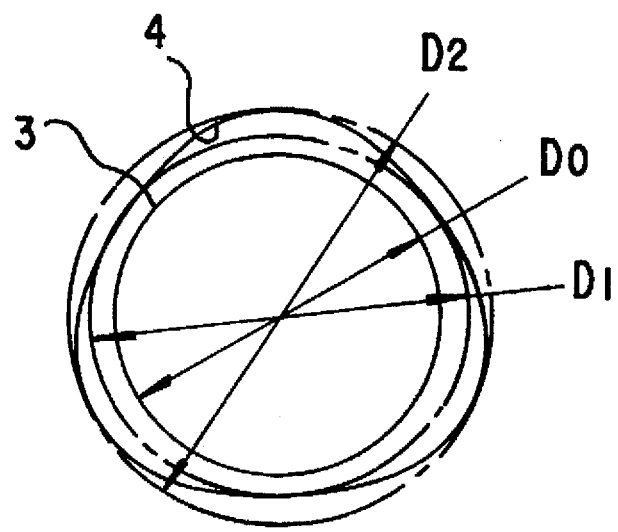
FIG. 7 is a schematic diagram showing an example of forming the inner circumference of the sleeve in a three-arc cross-sectional shape.

The sleeve 4 in embodiment 8 (also in comparative examples 6 and 7) was intended to finish its inner circumference in a circular cross-section, and the roundness was in the region of 2 to 3 µm. The sleeve 4 in embodiment 9 has the inner circumference in a three-arc surface shape cross-section combining three arcuate surfaces (see FIG. 7), and its roundness was about 10 µm. The term "rotary shaft 3" is not intended to exclude the reverse arrangement of a fixed shaft and a rotary sleeve from the invention.

The sleeves 4 of embodiments 8 and 9 (and also comparative examples 6 and 7) were formed in the blending rate shown in FIG. 6. The sleeve 4 was formed by blending polyphenylene sulfide (PPS) resin (TOHPLEN CO., LTD.: PPS-T4) with mica (CANADA MICA CO., LTD.: PHLO-GOPITE MICA, mean particle size 13 µm, modulus of longitudinal elasticity 175 GPa, coefficient of linear expansion 0.4 to $0.9 \times 10^{-5}$/°C.), and carbon fiber (TOHO RAYON CO., LTD.: BESPHITE IIM, fiber diameter approx. 7 µm, fiber length 6 mm, modulus of tensile elasticity 343 GPa), and sufficiently mixing them in a Henschel mixer, supplying the mixture into a twin-axis fusion extruder, and extruding and pelletizing, and supplying pellets into an injection molding machine, and injecting and molding in a specified die, thereby forming into the shape as shown in FIG. 1. Moreover, as for the sleeve 4 in embodiments 8 and 9, 5 wt. % of montan wax (dropping point 81. C.) was added to 95 wt. % of hexane, and it was immersed for about 5 seconds in a treating solution heated to 85. C, and then cooled in air.

FIG. 6 summarizes results of evaluation of starting and stopping life, run-out precision, and presence or absence of unstable vibration during rotation and driving of the dynamic pressure type bearing device using the sleeve 4 of embodiments 8 and 9, and the sleeve of comparative examples 6 and 7. Herein, the "starting and stopping life" refers to the number of times of operation until starting failure occurs or the shaft run-out precision deteriorates more than two times than in the initial state if possible to start, and the "run-out precision" and "presence or absence of unstable vibration during rotation and driving" were measured by a contact-free displacement meter 7 indicated by chain line in FIG. 1.

As clear from the results in FIG. 6, the dynamic pressure type bearing device using the sleeve 4 of embodiments 8 and 9 satisfies the starting and stopping life of 100,000 cycles or more and shaft run-out precision of within 10 µm required in the dynamic pressure type bearing device for a polygon scanner motor as in laser beam printer and facsimile apparatus, in particular. In embodiment 9, the shaft run-out precision was as great as 5 µm or less which was due to the three-arc shaped cross-section of the inner circumference of the sleeve 4.

The dynamic pressure type bearing device using the sleeve of comparative examples 6 and 7 was initially driven as satisfactorily as embodiment 8, but the starting and stopping life was short, and terminated somewhat between 30 and 40 thousand cycles. This is because the internal circumference shape of the sleeve was broken due to wear caused by starting and stopping and the shaft run-out precision could not be maintained. In this respect, in the dynamic pressure type bearing device using the sleeve 4 of embodiments 8 and 9, since there is a thin film of oil or grease on the inner circumference of the sleeve 4, the lubricity and wear resistance are improved, and the inner circumference shape is hardly broken, and the required starting and stopping life of more than 100,000 cycles can be achieved.

Besides, the resin composition is excellent in molding performance, and the parts can be integrated, and by integrating the parts, the number of parts is decreased and the total cost can be saved. For example, as shown in FIG. 4, by forming the sleeve 4 in a tubular form having a bottom, and supporting the lower end of the rotary shaft 3 by its bottom, it is not necessary to install such thrust bearing 6 as shown in FIG. 1. In addition, although not shown, the bearing accommodating portion of the housing 5 and other parts can be formed into one body together with the sleeve 4.

As described herein, since at least one of the shaft and sleeve of the dynamic pressure type bearing device is made of the resin composition, and a thin film of oil or grease is formed on the surface, the lubricity and wear resistance are enhanced, and it is possible to enhance the required functions, especially the starting and stopping life, in the dynamic pressure type bearing device for a polygon scanner motor as in laser beam printer and facsimile apparatus, in particular.

Still more, the resin composition of the invention is excellent in molding performance, and parts can be integrated, and by integration of parts, the number of parts is decreased, and the total cost is reduced.

As a result of such effects, the invention provides a dynamic pressure type bearing device of long life, high reliability, and low price, especially dynamic pressure type bearing device appropriate as the bearing for a polygon scanner motor as in laser mirror printer and facsimile apparatus.

What is claimed is:

1. A dynamic pressure type bearing device comprising a shaft and a sleeve rotatably receiving the shaft with a diametrical bearing clearance therebetween,
wherein at least one of the shaft and the sleeve is composed of a resin composition with load flexible temperature of 120° C. or more, modulus of elasticity of bending of 10 GPa or more, and coefficient of linear expansion of $3 \times 10^{-5}$/°C. or less.

2. A dynamic pressure type bearing device of claim 1, wherein the ratio of the bearing clearance to the mean diameter of the shaft ranges from 2/10000 to 500/10000.

3. A dynamic pressure type bearing device of claim 1, wherein the resin composition comprises 20 to 50 wt. % of synthetic resin, 20 to 60 wt. % of inorganic filler, and 10 to 30 wt. % of fibrous reinforcing material.

4. A dynamic pressure type bearing device of claim 3, wherein the resin composition further contains 1 to 7 wt. % of lubricating oil and 1 to 5 wt. % of oil retaining agent.

5. A dynamic pressure type bearing device of claim 3, wherein the inorganic filler is 0.5 to 80 μm in average particle size, 150 GPa or more in modulus of longitudinal elasticity, and $1 \times 10^{-6}$/°C. or less in coefficient of linear expansion.

6. A dynamic pressure type bearing device of claim 3, wherein the resin composition comprises at least one kind of fibrous reinforcing material of 200 GPa or more in modulus of tensile elasticity.

7. A dynamic pressure type bearing device of claim 1, wherein grooves for generating dynamic pressure are formed in one of an outer circumference of the shaft and an inner circumference of the sleeve.

8. A dynamic pressure type bearing device of claim 1, wherein the ratio of roundness to the mean diameter of the shaft in the outer circumference of the shaft and the inner circumference of the sleeve is 1/1000 or less.

9. A dynamic pressure type bearing device of claim 1, wherein the ratio of roundness to the mean diameter of the shaft is 1/1000 or less for one of an outer circumference of the shaft and an inner circumference of the sleeve, and for the other the difference in radius of an inscribed circle and a circumscribed circle to the mean diameter of the shaft is 2/1000 to 50/1000.

10. A dynamic pressure type bearing device of claim 9, wherein one of the outer circumference of the shaft and the inner circumference of the sleeve is of a corrugated cross-section having tiny convex and concave portions alternating in the circumferential direction.

11. A dynamic pressure type bearing device of claim 10, wherein the difference of between the radius of the inscribed circle and the radius of the circumscribed circle of said one of the outer circumference of the shaft and the inner circumference of the sleeve ranges from 2/1000 to 50/1000 mm.

12. A dynamic pressure type bearing device of claim 1, wherein at least the sleeve is composed of the resin composition, said sleeve having an axial lead supporting member formed integrally therewith.

13. A dynamic pressure type bearing device of claim 1, wherein at least one of the shaft and the sleeve has a thin film of oil or grease formed on a surface thereto.

* * * * *